(12) United States Patent
Liang et al.

(10) Patent No.: US 10,623,083 B2
(45) Date of Patent: Apr. 14, 2020

(54) DISTRIBUTED WIRELESS ANTENNAS AND MILLIMETER WAVE SCANNING REPEATER

(71) Applicants: Ping Liang, Newport Coast, CA (US); Dengkui Zhu, Beijing (CN); Boyu Li, Irvine, CA (US)

(72) Inventors: Ping Liang, Newport Coast, CA (US); Dengkui Zhu, Beijing (CN); Boyu Li, Irvine, CA (US)

(73) Assignee: RF DSP Inc., Irvine, CA (US)

( * ) Notice: Subject to any disclaimer, the term of this patent is extended or adjusted under 35 U.S.C. 154(b) by 24 days.

(21) Appl. No.: 16/212,704

(22) Filed: Dec. 7, 2018

(65) Prior Publication Data

US 2019/0181943 A1     Jun. 13, 2019

Related U.S. Application Data

(60) Provisional application No. 62/596,919, filed on Dec. 11, 2017.

(51) Int. Cl.
| | | |
|---|---|---|
| *H04B 7/155* | (2006.01) | |
| *H04W 16/26* | (2009.01) | |
| *H04B 7/024* | (2017.01) | |
| *H04W 16/28* | (2009.01) | |
| *H04L 25/02* | (2006.01) | |
| *H04B 7/0452* | (2017.01) | |
| *H04B 7/26* | (2006.01) | |
| *H04W 88/08* | (2009.01) | |

(52) U.S. Cl.
CPC ......... *H04B 7/15507* (2013.01); *H04B 7/024* (2013.01); *H04B 7/0452* (2013.01); *H04B 7/1555* (2013.01); *H04B 7/2606* (2013.01); *H04L 25/0204* (2013.01); *H04W 16/26* (2013.01); *H04W 16/28* (2013.01); *H04W 88/085* (2013.01)

(58) Field of Classification Search
CPC .. H04B 7/024; H04B 7/18504; H04B 7/0452; H04B 7/0617; H04B 7/0695; H04B 7/08; H04B 7/2615; H04B 7/0408; H04B 7/0413; H04B 7/0613; H04B 7/0619; H04B 7/0854; H04B 7/15507; H04B 7/1555; H04B 7/2606; H04L 25/0204; H04W 16/28; H04W 16/26; H04W 88/085
USPC .......................................... 455/15
See application file for complete search history.

(56) References Cited

U.S. PATENT DOCUMENTS

2002/0193147 A1 * 12/2002 Li ..................... H01Q 1/007
                                                          455/562.1

OTHER PUBLICATIONS

T. S. Rappaport et al., "Millimeter Wave Mobile Communications for 5G Cellular: It Will Work!" IEEE Access, vol. 1, pp. 335-349, 2013.

(Continued)

*Primary Examiner* — Shaima Q Aminzay
(74) *Attorney, Agent, or Firm* — Guosheng Wang; United States Research and Patent Firm

(57) ABSTRACT

This invention presents a millimeter wave (mmWave) Distributed Wireless Smart Antenna (DWSA) or scanning-capable repeater that can form different radio wave beam patterns to scan for spatial beam direction(s) or beam alignment to build one or more mmWave wireless links with one or more User Equipment, and complete pass-through beamforming with one or more central base stations.

20 Claims, 4 Drawing Sheets

(56) References Cited

OTHER PUBLICATIONS

S. Rangan et al., "Millimeter-Wave Cellular Wireless Networks: Potentials and Challenges," Proceedings of the IEEE, vol. 102, No. 3, pp. 366-385, Mar. 2014.

* cited by examiner

Scanning-Capable Repeater — 5

DISTRIBUTED WIRELESS ANTENNAS AND MILLIMETER WAVE SCANNING REPEATER

FIELD OF INVENTION

This invention relates generally to a centimeter or millimeter wave wireless antennas or repeaters for wireless communication, and more particularly, to centimeter or millimeter wave wireless antennas or repeaters capable of scanning and beam alignment.

BACKGROUND

With the development of wireless technology and wireless applications, the demand for higher mobile data rate keeps growing rapidly. The sub 6-GHz frequency bands widely employed in wireless systems nowadays have already been crowded, and they can no longer be sufficient to meet such a challenging demand, as shown in the research paper "Millimeter Wave Mobile Communications for 5G Cellular: It Will Work!" by T. S. Rappaport et al. published in *IEEE Access*, vol. 1, pp. 335-349, 2013 (Rappaport et al. 2013). To overcome the global spectrum shortage challenge of the upcoming Fifth Generation (5G) wireless systems, exploiting the much broader available spectrum of centimeter and millimeter wave above 6-GHz, e.g., 28 GHz, 60 GHz, etc., has been considered as a promising solution (Rappaport et al. 2013). For the sake of simplicity, all frequency bands of centimeter, millimeter or even shorter wavelengths are all referred to as millimeter wave (mmWave) hereafter.

Although a mmWave system can provide huge bandwidth, its coverage is limited by its strong propagation directivity, large propagation loss, and high sensitivity to blockage, as shown in "Millimeter-Wave Cellular Wireless Networks: Potentials and Challenges," by S. Rangan et al. published in *Proceedings of the IEEE*, vol. 102, no. 3, pp. 366-385, March 2014. For a mmWave BS, the large propagation loss is compensated by employing the antenna array that offers high array gain, while the strong propagation directivity can be overcome by employing multiple antenna arrays facing different directions where each antenna array can generate multiple radio beam patterns to cover multiple directions. However, because of the high sensitivity to blockage, multiple BSs are needed to cover an area with obstacles such as buildings, side streets, or hallways. FIG. 1 illustrates a simple example in which two mmWave Base-Stations (BSs) 1 serve two mmWave User-Equipments (UEs) 2 simultaneously in an area with one obstacle 3. In this example, both UE1 and UE2 need to be served, but only UE1 is in the Light-of-Sight (LoS) coverage area of BS1. If only BS1 is deployed, due to the large blockage loss in mmWave systems, it cannot serve UE2 blocked by the obstacle hence out of its LoS coverage area. As a result, the system coverage needs to be improved by deploying BS2 to offer LoS coverage to the area where the signal from BS1 is blocked by the obstacle. Note that each BS needs to have an optical fiber or cable connection to provide the data connection to the network, e.g., backhaul or fronthaul. Unfortunately, the need of optical fiber or cable connections to multiple BS sites increases the network deployment cost.

One alternative method to improve the system coverage is to deploy repeaters, Amplify-and-Forward (AF) or Decode-and-Forward (DF). A repeater enables a mmWave beam signal from a BS to cover an area by changing its direction, e.g., turning a corner to cover a side street or side hallway without the need to lay a fiber or cable connection to the site of the repeater. Because repeaters do not require optical fiber or cable connections, the network deployment cost can be much lower than deploying multiple BSs. However, in the case of mmWave systems, the strong signal propagation directivity also limits the coverage of a Conventional Repeater (C-R) with fixed transmitting and receiving directions. FIG. 2 illustrates a simple example in which a C-R 4 is deployed to improve the coverage for the area where the signal from the BS is blocked. In this example, similarly to FIG. 1, due to the large blockage loss in mmWave systems, BS1 cannot serve UE2 and UE3 blocked by the obstacle. Instead of deploying a second BS as in FIG. 1, a C-R with fixed transmitting and receiving directions is deployed at a location where it can receive the signal from BS1, amplify it, and forward it to part of the blocked area. Due to the strong signal propagation directivity of the mmWave signal, the C-R in this example can only provide extended LoS coverage between the two dotted lines. Since UE2 is in this extended coverage area, it can be served by the BS through the C-R. However, because UE3 is out of this extended LoS coverage area, so it still cannot be served by the BS. In summary, in a mmWave system, deploying a C-R at a location where the signal from the BS is blocked might not be able to provide sufficient coverage to that area. As a result, to cover the same blocked area that can be properly served by deploying an additional BS, tens of C-Rs might need to be deployed, which is inefficient for deployment and significantly compromises the cost advantage of deploying C-Rs.

This invention avoids the high costs of laying many fibers for high bandwidth backhauls, fronthauls or other variants to densely deployed very high throughput small cells, which are base stations or access points with small or hotspot coverage area and throughput of tens to hundreds of Gbps. Their signals are typically transmitted using wide bandwidth in high frequency bands with carrier frequency from above 3 GHz to 10's or 100's of GHz. We refer to all these high frequency bands as mmWave for convenience. For example, the carrier frequency can be 28 GHz, 70-80 GHz or above 100 GHz and the signal bandwidth can be 500 MHz or above 1 GHz. With this invention, the conventional fronthaul or backhaul or other variants are eliminated. This invention provides a method to effectively improve the coverage of a mmWave system by employing improved smart repeaters capable of scanning. A smart repeater of this invention is also referred to as a Distributed Wireless Smart Antennas (DWSA).

BRIEF DESCRIPTION OF DRAWINGS

Abbreviations used in the following list of drawings are defined in the next section which provides the detailed description of the embodiments of the invention.

FIG. 3 shows a simple example of the scanning-capable mmWave repeater with two uplink AF circuit paths and two downlink AF circuit paths.

FIG. 4 shows a simple example in which a scanning-capable repeater with one UE-facing antenna array that can form multiple radio wave beam patterns is deployed to improve the coverage for the area where the signal from the BS is blocked.

DETAILED DESCRIPTION OF PREFERRED EMBODIMENTS

Figure 1:
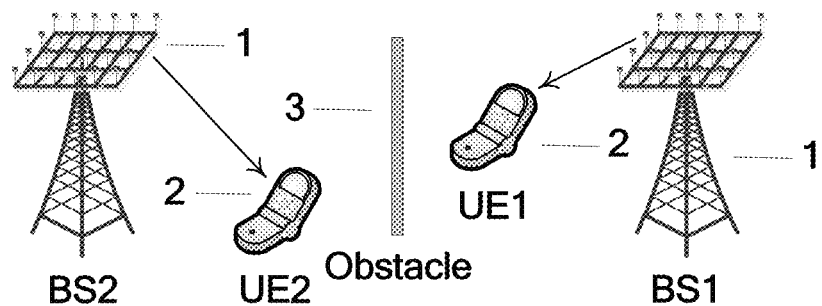
FIG. 1 shows a simple example in which two mmWave BSs serve two mmWave UEs simultaneously in an area with one obstacle.

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

In the following descriptions, an antenna and a Radio Frequency (RF) path is used interchangeably to indicate a Transmit (Tx) or Receive (Rx) RF circuit and an antenna connected to it unless indicated by the context otherwise. For example, in a hybrid beamforming system, one RF path may be connected to multiple antenna elements via a beam-forming circuit, mostly analog. In such a system, all the antenna elements connected to the same RF path can be treated as a single equivalent antenna in the baseband processing. Hereafter, a pilot signal may mean a signal transmitted by one antenna for the purpose of estimating the channel between the transmitting antenna and one or more receiving antennas. It may also be called a reference signal, a channel estimation signal, or a test signal.

One embodiment uses spatially distributed, digitally controlled, single-band-to-single-band or single-band-to-multi-band smart mmWave repeaters, referred to as Distributed Wireless Smart Antennas (DWSAs) which are equipped with beam-steering antennas to serve UEs in the coverage areas of the DWSAs. In the case single-band-to-single-band CBS-DWSA link, the connection between the backhauled Central Base Station CBS uses a mmWave wireless band with total bandwidth of BW, e.g., on one spatial beam out of the CBS for each DWSA, and the DWSA-UE link can support one mmWave band, e.g., on one spatial beam out of the DWSA, with a bandwidth smaller than or equal to BW. In the case single-band-to-multi-band BS-DWSA link, the connection between the CBS uses mmWave wireless band (s) with total bandwidth of N·BW, e.g., on one spatial beam out of the CBS for each DWSA, and the DWSA-UE link can support N mmWave bands, e.g., N spatial beams out of the DWSA with one band on each spatial beam, each of the band or beam has a bandwidth 1·BW, or n<N DSWA-UE bands/beams, each of which uses different frequency band and the sum of the bandwidth of all the DSWA-UE bands/beams is smaller or equal to N·BW. The frequency bands used for the CBS-DWSA link and the DWSA-UE link can be the same or different. In the case of the same band is used, the DWSA uses a directional antenna for the UEs where the direction of the CBS-DWSA beam and the DWSA-UE beam are sufficiently separated so that there is sufficient RF isolation to reduce the self-interference. Any remaining self-interference can be canceled using interference cancelation circuits that samples the transmitted signal to generate a cancelation signal to be added to the received signal. This further reduces the self-interference.

The CBS includes a base band unit (BBU) and a radio unit (RU) where the radio processing and base band processing of all the UE signals are performed. The CBS manages and coordinates all the DWSAs to better serve all the UEs. Each DWSA comprises of an antenna, antenna array or electromagnetic wave lens with mmWave waveguides or probes (all referred to as antenna) for the CBS-DWSA wireless link; an antenna for the DWSA-UE wireless links, which can be the same as or different from the antenna for the CBS-DWSA wireless link; and RF circuit primarily consisting of amplifiers connecting the CBS-DWSA antenna and DWSA-UE antenna. The RF circuit may further consist of filters, and frequency mixers or shifters to shift the frequency band from the band of the wireless link on one side to the frequency band of the wireless link on the other side. It may further consist of self-interference cancelation circuit if the same frequency band is used on both sides of the wireless links.

In one embodiment, the BBU and RU at the CBS beam-forms to the DWSAs using multi-user MIMO (MU-MIMO) so that the same frequency band can be spatially multiplexed to serve a plural of DWSAs. Beam alignment and channel estimation is performed to increase the throughput of the plural of CBS-DWSA wireless links. Furthermore, the CBS performs MU-MIMO spatial multiplexing with a plural UEs with the associated DWSAs included as part of the RF channel between the CBS and the UEs. This is referred to as DWSA Pass-Through Beamforming (PTB). PTB reduces inter-DWSA and/or inter-UE interference. The CBS manages or controls the beam alignment of the DWSAs and the UEs and perform channel estimation of the total channel between the CBS and the UEs to increase the throughput of the plural of total CBS-UE wireless links. Instead of PTB, because the CBS can obtain information of all the DWSAs, the CBS can coordinate the beam directions of multiple DWSAs to reduce interference among the DWSAs. In one embodiment, the CBS pools processing and/or spectrum resources and can allocate the available bandwidth among a plural of CBS-DWSA wireless links and/or among DWSA-UE/CPE wireless links to meet the distribution of the throughput demand of the UEs. This embodiment is a new type of fronthaul as the signals on the multiple spatially multiplexed beams between the CBS and the DWSAs are not digital IQ signals as in conventional fronthaul. Instead, they are RF signals to be transmitted and pass-through-beamformed to the UEs over the CBS-DWSA-UEs channels, with one or more carrier frequency shift operations at a DWSAs if different frequency bands are used for the wireless link between the CBS and the DWSA and the wireless link between the DWSA and the UEs. The UEs are served through the DWSAs by the CBS using PTB. In this embodiment, we say that the CBS uses MU-MIMO RF-over-RF-fronthaul (RR-fronthaul) for the wireless link between the CBS and the DWSA. The DWSAs amplify the RF signals, shift carrier frequency if needed, and may also use filters to suppress out-band signals. When the same frequency band is used for the RR-fronthaul and the DWSA-UE wireless links, a DWSA can use one directional antenna or beam direction(s) of the same antenna or antenna array for the RR-fronthaul, and a different directional antennas or different beam direction(s) of the same antenna or antenna array for the DWSA-UE wireless links. The RF isolation between the different directional antennas or the different beam directions should be large. In one example, the RF isolation Ri in dB, the gain G of the DWSA RF path and the desired SNR of the signal at the intended destination of the RF signal, which can be the CBS in the UL or the UEs in the DL, satisfy Ri−G≥SNR.

At a first time period, a CBS beamforms with a first subset of multiple DWSAs, and through which to beamform with a set of UEs using PTB. Each or some of the DWSAs can include a RF repeater to repeat a RF signal on a part of the spectral band to another DWSA that is not in the Line of Sight (LoS) of the CBS so that a part of RF signal from the CBS can reach a DWSA not in the LoS of the CBS. Then the CBS can perform pass-through beamforming with the UEs in the coverage area of the first subset of DWSAs through the first subset of DWSAs and with UEs in the coverage area of the non-LoS DWSA through the RF repeaters in the first subset of DWSAs and through the non-LoS DWSA. At a second time period, a CBS beamforms with a second subset of multiple DWSAs, and through which to beamform with a set of UEs using PTB. Each or some of these DWSAs can also include a RF repeater to repeat a RF signal on a part of the spectral band to another DWSA that is not in the Line of Sight (LoS) of the CBS so that a part of RF signal from CBS can reach a DWSA not in the LoS of the CBS. The CBS can then perform pass-through beamforming with the UEs in the coverage area of the second subset of DWSAs through the second subset of DWSAs and with UEs in the coverage area of the non-LoS DWSA through the RF repeaters in the second subset of DWSAs and through the non-LoS DWSA. A media access controller (MAC) in the CBS schedules the first and second subsets of UEs and the associated DWSAs, and the RF repeaters if any is present and needed, in the first and second time period to achieve PTB with the UEs.

In one embodiment, a DWSA further include UE detection circuits that listens to uplink (UL) signals from UEs and when a new UE is detected, the DWSA sends UL signal to the CBS to report to the CBS of the new UE. In another embodiment, a DWSA's receiver controls the DWSA-UE antenna to scan for UL signals from UEs. In yet another embodiment, a DWSA's transmits commands to control the DWSA-UE antenna to scan the range of coverage angles with broadcast and/or control messages and DWSA's receiver controls the DWSA-UE antenna to scan for UL signals from UEs. When one or more UEs under the coverage of one or more DWSAs have data to transmit or receive, the transmitters in the DWSAs are in work mode, steer their DL beams beamform to the UEs. When there is no data to be transmitted to UEs in the DWSA's coverage, the DWSA's data transmission to UEs is in sleep or idle mode, or turned off to save power.

In another embodiment, a lower frequency band with better coverage and propagation property than mmWave, e.g., in sub-6 Ghz spectrum, is used for the CBS to communicate with and control the DWSAs under its coverage, including controlling the beam scanning and alignment of DWSAs to establish or maintain wireless links with UEs. The commands or signals on the lower frequency band are synchronized in time with the signals or events in the mmWave bands for the CBS-DWSA wireless links.

It is known in the art that analog RF signals can be directly modulated onto light waves and transmitted over optical fiber with low loss. However, transmitting high frequency analog RF signals over wires or cables does not work well because high frequency and wideband analog signals decay quickly over a wire or cable. One embodiment uses wires or cables, e.g., ethernet cables or coaxial cable, to transmit band-limited analog signals, e.g., bandwidth=20, 100 or 160 MHz, by transmitting the RF signal using a zero or low intermediate carrier frequency (IF) to avoid to the problem of fast decaying of wideband analog RF signals with high frequency carriers. This is referred to RF-over-wire-fronthaul (RW-fronthaul). In the DL, the CBS uses a digital-to-analog conversion DAC circuit to convert a digital baseband signal to a band-limited analog signal and transmits it over the wire or cable using a zero or low IF. A distributed smart antenna (wired in this case, referred to as DSA-W) or remote radio unit (RU) receives the band-limited analog signal over the RW-fronthaul, up-converts the signal to a carrier frequency, e.g., using a mixer driven by a local oscillator at the carrier frequency, and transmits the RF signal over the air. In the UL, a DSA-W receives a RF signal at a carrier frequency from the UEs, down-converts the RF signal to zero or low IF, transmits the resulting band-limited analog signal to a CBS over a wire or cable. The CBS receives the analog signal, down-converts the signal to baseband if necessary, and performs ADC to obtain the digital baseband signal for further processing in the physical and upper layers. A DSA-W or the RU consists primarily of one or more receiving amplifiers, a mixer, a local oscillator, one or more transmitting amplifiers, and filters if needed. It may also include synchronization circuits to synchronize the carrier frequency, and phase if necessary for cooperative beamforming or distributed MIMO, with other DSA-Ws or RUs. This embodiment allows the ADC, DAC and main radio signal circuits to be located with the CBS, and makes the spatially deployed DSA-Ws or RUs simpler compared to conventional RUs in a mobile network with a conventional digital IQ signal fronthaul where the ADC, DAC and all radio signal circuits are with the RUs. In addition to offering performance improvements and efficiency gains, simplifying the DSA-Ws or RUs reduces deployment and maintenance cost because they must be widely distributed spatially and mounted at substantial height.

In another embodiment, a central base station CBS capable of MU-MIMO in sub-6 GHz frequency range uses MU-MIMO beamforming to provide backhaul connection to customer premise equipment (CPEs) or small cell (SCs) which uses a directional high-gain, e.g., >20 dBi, antenna to establish the wireless link with the CBS. A CPE or SC can also use dual polarized directional high-gain antennas to provide either diversity or spatial multiplexity to establish two independent communications streams with the CBS. At a first time period, a CBS beamforms with a first subset of CPEs or SCs, each or some of which can include a RF repeater to repeat a RF signal on a part of the spectral band to another CPE or SC that is not in the Line of Sight (LoS) of the CBS so that a part of RF signal from CBS can reach a CPE or SC not in the LoS of the CBS. The CBS can then perform pass-through beamforming the non-LoS CPE or SC through one or more of the RF repeaters in the first subset of CPEs or SCs. At a second time period, a CBS beamforms with a second subset of CPEs or SCs, each or some of which can also include a RF repeater to repeat a RF signal on a part of the spectral band to another CPE or SC that is not in the Line of Sight (LoS) of the CBS so that a part of RF signal from CBS can reach a CPE or SC not in the LoS of the CBS. The CBS can then perform pass-through beamforming the non-LoS CPE or SC through one or more of the RF repeaters in the second subset of CPEs or SCs. A media access controller (MAC) in the CBS schedules the first and second subsets of CPEs or SCs in the first and second time period, and the RF repeaters and non-LoS CPEs or SCs for PTB.

One embodiment of this invention is an enhanced mmWave Scanning-Capable Repeater (SC-R, also referred to as a DWSA) comprising one or more AF or DF circuit paths for both the Downlink (DL) and Uplink (UL) directions; one or more BS-facing antenna arrays for communicating with one or more BSs; one or more UE-facing antenna arrays that can form different radio wave beam patterns for communicating with one or more UEs; a scanning module that generates beam patterns to scan the coverage area of the SC-R; a communication module that receives and decodes commands from one or more BSs, and sends information on the SC-R to one or more BSs; and a controlling module that controls one or more second antenna arrays to scan for beam directions aimed to one or more UEs, selects one or more beam directions to build one or more communication links to or align the beam direction(s) with one or more UEs, as well as controls the communication module to send information on the SC-R to one or more BSs. Each SC-R can communicate with one BS using one antenna array or communicate with one or more BSs using multiple antenna arrays. Each BS-facing antenna array can be connected to more than one DL AF or DF circuit path using a signal splitter and more than one UL AF or DF circuit path using a signal combiner, while each UE-facing antenna array is only connected to one DL AF or DF circuit path and one UL AF or DF circuit path.

The control module can command the communication module to send its Identification (ID) number and its achievable beam patterns of each UE-facing antenna array to one or more BSs, and send the associated BS beam pattern of each BS-facing antenna array to the associated BS. With all the information, each associated BS can properly control the SC-R to scan its coverage area.

The control module can also command the communication module to send the information on its current scanning beam patterns to each associated BS. With this information, the BS can learn the UEs associated with each beam pattern of each UE-facing antenna array of the SC-R.

The control module can also command the communication module to send pilot signals to one or more BSs so that they can estimate the channels between the SC-R and them, or send to one or more BSs the estimated channels between the SC-R and them estimated at the SC-R using the pilot signals sent from them. With the channel information, a BS can perform hybrid beamforming using multiple RF chains to boost the DL and UL Signal-to-Interference-plus-Noise Ratios (SINRs) for one or multiple BS-facing antenna arrays of one or more SC-Rs that interfere with each other at the same time-frequency resource.

Figures 3, 4:
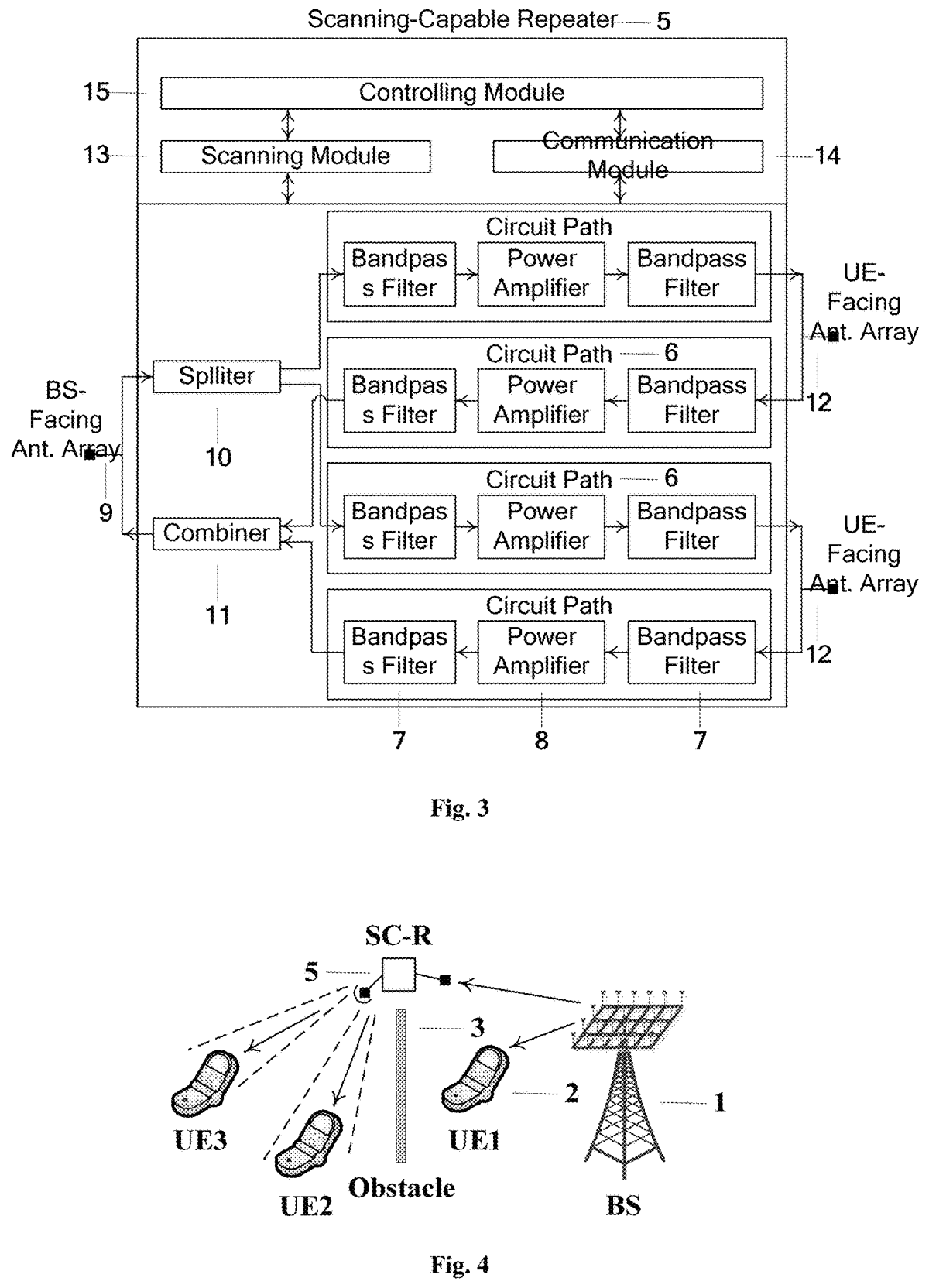

FIG. 3 illustrates a simple example of the mmWave SC-R 5 with two DL AF circuit paths 6 and two UL AF circuit paths 6, where each AF circuit path includes two bandpass filters 7 and a power amplifier 8. The two DL circuit paths are connected to a BS-facing antenna array 9 through a signal splitter 10, while the two UL circuit paths are connected to the BS-facing antenna array 9 through a signal combiner 11. Two UE-facing antenna arrays 12 are employed where each UE-facing antenna array is connected to one DL circuit path and one UL circuit path. Compared to C-Rs with fixed directions, the improved SC-R requires that each UE-facing antenna array can form different beam patterns, and includes a scanning module 13 to perform beam pattern scanning, a communication module 14 to exchange information with the BS, and a controlling module 15 to manage the beam scanning, select a beam pattern to serve UEs, and command the communication module to send information on the SC-R to the BS.

Figure 2:
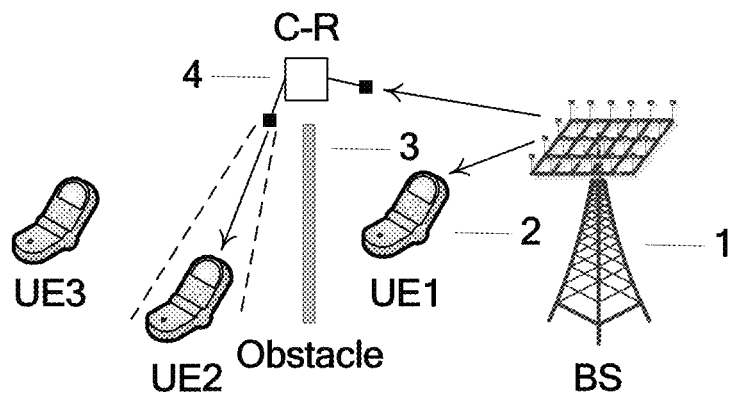
FIG. 2 shows a simple example in which a conventional repeater is deployed to improve the coverage for the area where the signal from the BS is blocked.
Figure 5:
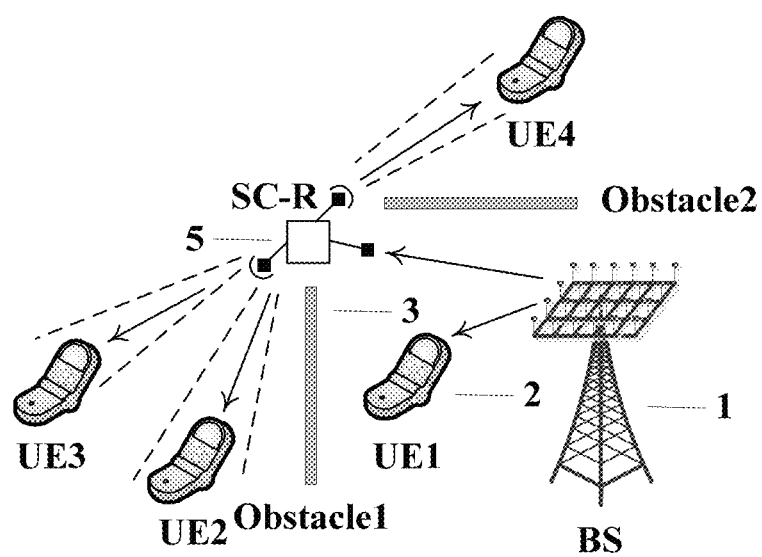
FIG. 5 shows a simple example in which a scanning-capable repeater with two UE-facing antenna arrays that can form multiple radio wave beam patterns is deployed to improve the coverage for two areas simultaneously where the signal from the BS is blocked.

Another embodiment of this invention is a mmWave wireless communication system comprising one or more BSs, one or more UEs, and one or more mmWave SC-Rs described above, wherein each BS has beam patterns that cover one or more mmWave SC-Rs, and each SC-R scans for beam directions aimed to one or more UEs in its coverage area. Each BS may also scan for UEs in its own LoS coverage area. Each SC-R can employ one or more UE-facing antenna arrays that capable of form beam patterns to serve UEs, and all beam patterns from all UE-facing antenna arrays, which are configured to aim non-overlapping directions, form its extended coverage area. When a SC-R is associated with multiple BSs, their UE-facing antenna arrays are exclusively assigned for different BSs to avoid conflict. FIG. 4 illustrates a simple example in which a SC-R with one UE-facing antenna array that can form multiple radio wave beam patterns is deployed to improve the coverage for the area where the signal from the BS is blocked. In this example, UE2 is in the coverage of one beam pattern between the bottom two dotted lines, while UE3 is in the coverage of another beam pattern between the top two dotted lines. As a result, by collaborating with the BS to manage the time-frequency resource, the SC-R can provide extended coverage for the area within its beam patterns. Compared to the example in FIG. 2, by replacing the C-R with the SC-R, the extended coverage area is enlarged, and UE3 that cannot be served using the C-R now can be served by employing the SC-R. FIG. 5 shows another simple example in which a SC-R with two UE-facing antenna arrays that can form multiple radio wave beam patterns is deployed to improve the coverage for two areas simultaneously where the signal from the BS is blocked. In this example, compared to the example in FIG. 4, one additional obstacle, Obstacle2, blocks another area, which is out of the coverage of the achievable beam patterns that can be formed by the SC-R with one UE-facing antenna array employed in FIG. 4. In FIG. 5, by using a SC-R with two UE-facing antenna arrays, then, UEs in the additional blocked area, e.g., UE4, can be covered by the additional UE-facing antenna arrays. Similarly, by collaborating with the BS to manage the time-frequency resource, the SC-R can provide extended coverage for both the two blocked areas within its beam patterns from two UE-facing antennas, so that UE2, UE3, and UE4 in this example can be all served by the SC-R.

In one embodiment, after deployment, each SC-R selects a direction for each of its BS-facing antenna array to build a communication link to a BS with the highest directional gain. In mmWave systems, a BS and a UE must periodically scan their beam patterns using dedicated time-frequency resource to pair their beam patterns and choose a proper pair to build a communication link with the strongest signal strength to exchange data. For a SC-R, when a BS scans, it listens to learn the received signal strength levels with different BS beam patterns. Then, the direction of each BS-facing antenna array is manually adjusted to select the direction achieving the strongest signal strength.

In addition, each SC-R has a unique ID number, which is associated with its achievable beam patterns of each UE-facing antenna array. Once the direction of each BS-facing antenna array is fixed, the SC-R can use its communication module to send each associated BS the repeater-specific information including its ID number, its achievable beam patterns of each UE-facing antenna array, and the associated BS beam pattern for each BS-facing antenna array that receives the strongest signal strength, or all the repeater-specific information can be manually added to the database of each associated BS.

The scanning of a SC-R needs to be properly controlled. In one embodiment, a BS sends control signals to the SC-R to manage its scanning. With all the repeater-specific information, a repeater-assisted BS uses the associated beam pattern to send control signals to each associated SC-R. Based on the SC-R ID number and its achievable beam patterns of each UE-facing antenna array, a BS can manage the scanning of each associated SC-R. Under the control of a BS, at a scanning time instant, the SC-R uses its scanning module to scan one beam pattern employing one UE-facing antenna array or scan multiple beam patterns employing multiple UE-facing antenna arrays. When a SC-R is associated with multiple BSs, each BS only controls the UE-facing antenna array or antenna arrays assigned to it to avoid conflict.

In another embodiment, the SC-R manages its own scanning. It scans following a specific pattern. The scanning pattern can be preprogrammed locally by the SC-R or configured online with commands from a BS. At a scanning time instant, the SC-R uses its scanning module to scan one beam pattern employing one UE-facing antenna array or scan multiple beam patterns employing multiple UE-facing antenna arrays. At the same time instant, the SC-R also uses its communication module to send the information on its under-scanning beam pattern or beam patterns to each of its associated BS.

Similarly to a BS and a UE, the scanning of the mmWave SC-R is conducted periodically in order to track the movement of a UE or the direction change of its antenna array.

After the scanning of the SC-R, each associated BS learns the UEs that can be served by the SC-R and the beam patterns of the UE-facing antenna array or antenna arrays associated with those UEs. Based on the information, each associated BS must properly schedule these UEs with their associated SC-R beam patterns and send control signals to command the SC-R to use the associated beam pattern for each UE-facing antenna array to cooperate with the scheduling.

Case 1: one UE is associated with one antenna array of the SC-R

In this case, under the control of a BS, the SC-R always employs the beam pattern associated with the UE, and the BS can schedule it on any available time-frequency resource.

Case 2: multiple UEs are associated with one antenna array of the SC-R

In this case, under the control of a BS, the SC-R applies one associated beam pattern to serve one or one group of UEs in one time period and applies another associated beam pattern to serve another or another group of UEs in another time period. The BS needs to schedule the UEs served by a same beam pattern on different frequency resources or time resources.

Case 3: multiple UEs are associated with multiple antenna arrays of the SC-R

In this case, in one embodiment, under the control of a BS, the SC-R employs one associated beam pattern of an antenna array to serve the corresponding UEs in one time period and employs another associated beam pattern of the same antenna array or another antenna array to serve the corresponding UEs in another time period. The BS needs to schedule the UEs served by a same beam pattern on different frequency resources or time resources.

In another embodiment, under the control of a BS, at one time instant, the SC-R employs one associated beam pattern of a first antenna array using the first frequency band to serve the corresponding UEs, and employs one associated beam pattern of a second antenna array using the second frequency band to serve the corresponding UEs. At another time instant, the SC-R employs another associated beam pattern of the first antenna array using the first frequency band to serve the corresponding UEs, and employs another associated beam pattern of the second antenna array using the second frequency band to serve the corresponding UEs. The BS needs to schedule the UEs served by a same beam pattern on different frequency resources or time resources.

A BS can be associated with multiple SC-Rs. In one embodiment, SC-Rs are deployed to serve non-overlapping areas and each BS-facing antenna array only receives signal from its associated BS antenna array. In this case, each SC-R functions perfectly individually.

In another embodiment, SC-Rs are deployed to serve non-overlapping areas but each BS-facing antenna array receives signal from multiple BS antenna arrays. In this case, the BS can communicate with the SC-Rs to estimate the channels between it and them, and perform hybrid beamforming using multiple RF chains to boost the received DL and UL SINRs for these BS-facing antenna arrays that interfere with each other at the same time-frequency resource. An alternative method is to schedule each communication link between a BS antenna array and a BS-facing antenna array of a SC-R on a different time-frequency resource.

In another embodiment, SC-Rs are deployed to serve overlapping areas but each BS-facing antenna array only receives signal from its associated BS antenna array. In this case, the BS can use the estimated channels between it and them to perform hybrid beamforming using multiple RF chains to boost the received DL and UL SINRs for the UEs in an overlapping area that interfere with each other at the same time-frequency resource. An alternative method is to schedule each UE in an overlapping area on a different time-frequency resource.

In another embodiment, SC-Rs are deployed to serve overlapping areas and each BS-facing antenna array receives signal from multiple BS antenna arrays. In this case, the BS can use the estimated channels between it and them to perform hybrid beamforming using multiple RF chains to boost the received DL and UL SINRs for the UEs in an overlapping area that interfere with each other at the same time-frequency resource. An alternative method is that the BS communicates with the SC-Rs to estimate the channels between it and them, and performs hybrid beamforming using multiple RF chains to boost the received DL and UL SINRs for these BS-facing antenna arrays that interfere with each other at the same time-frequency resource, then schedules each UE in an overlapping area on a different time-frequency resource.

In the prior art, a conventional BS with fiber or cable connection must be placed at each SC-R site to provide the same coverage. The advantage of this invention is that one BS site with fiber or cable connection can provide coverage to a much larger area that is not within the LoS area of the BS, enabling a mmWave signal to turn a corner or change a direction. Each SC-R is simpler and has lower cost than a BS, and the RF Tx path with a Digital-to-Analog Converter (DAC) and a up-conversion mixer as well as the Rx path with an Analog-to-Digital Converter (ADC) and a down-conversion mixer can be centralized at the BS, and the baseband processing can also be centralized at the BS or at a baseband unit of a Cloud Radio Access Network (C-RAN).

Another embodiment of this invention is a control channel between a BS and a SC-R that is mainly used by the BS to transmit control signals to the SC-R to control its beam pattern of each UE-facing antenna array, can be used by the BS to send a defined scanning pattern to the SC-R, can be used by the BS to send pilot signals to the SC-R so that the SC-R can estimate the channel between them, can be used by the SC-R to report to the BS its under-scanning beam pattern of each UE-facing antenna array if the SC-R manages its own scanning, can be used by the SC-R to report to the BS its repeater-specific information to the BS, can be used by the SC-R to report to the BS the estimated channel between them, and can be used by the SC-R to send pilot signals to the BS so that the BS can estimate the channel between them. In one embodiment, the control channel uses a dedicate frequency resource that is different from the data transmission. In another embodiment, the control channel can use the guard period of the data transmission if the type of SC-R is DF.

Figure 6:
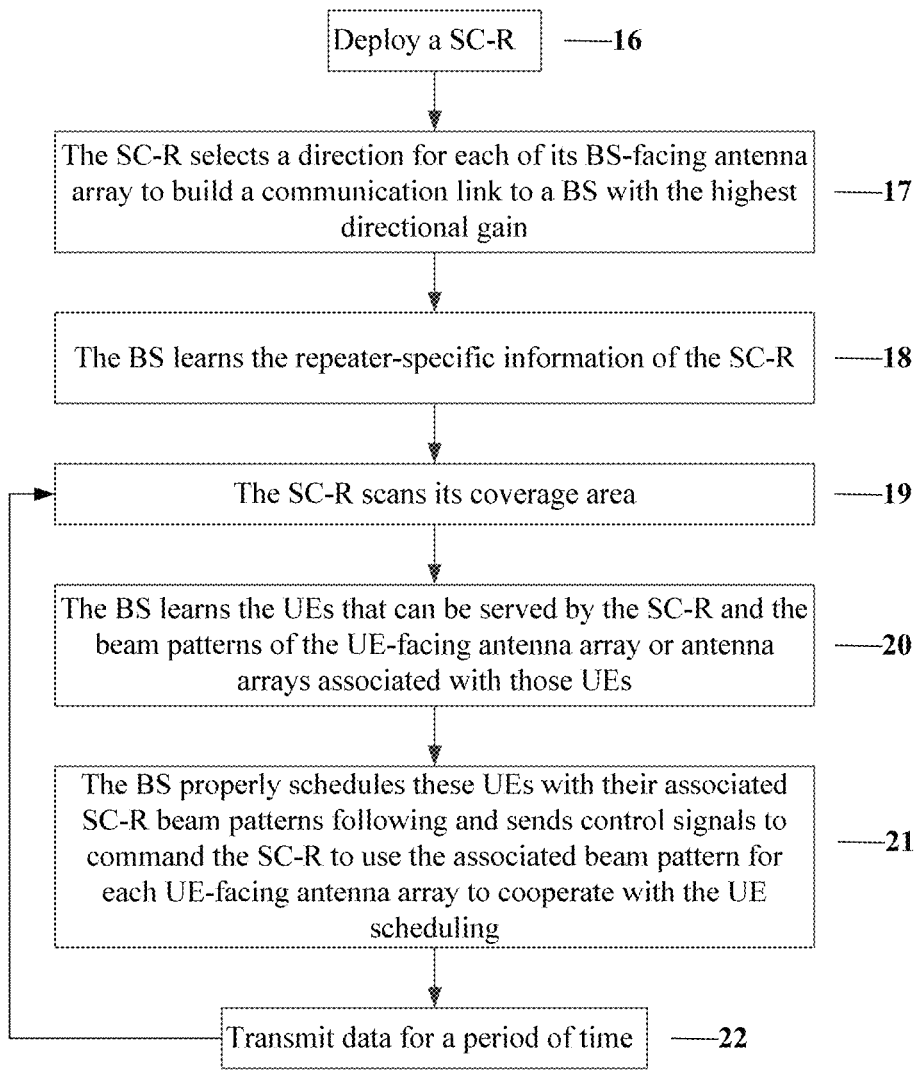
FIG. 6 shows the protocol process for a BS to control the beam scanning at a SC-R.

Another embodiment of this invention is a protocol for a BS to control the beam scanning at a SC-R. The process of the protocol is illustrated in FIG. 6. Specifically, after a SC-R is deployed 16, it selects a direction for each of its BS-facing antenna array to build a communication link to a BS with the highest directional gain 17. Then, the BS learns the repeater-specific information of the SC-R 18. Next, the SC-R scans its coverage area 19. After that, the BS learns the UEs that can be served by the SC-R and the beam patterns of the UE-facing antenna array or antenna arrays associated with those UEs 20. Then, based on the information, the BS properly schedules these UEs with their associated SC-R beam patterns and sends control signals to command the SC-R to use the associated beam pattern for each UE-facing antenna array to cooperate with the UE scheduling 21. Finally, the data transmission is conducted for a period of time 22, before the process goes back to 19 and continues.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A wireless system comprising
one or more Central Base Stations (CBS) each comprising a connection to a network, a Base Band Unit (BBU) and a Radio Unit (RU) where the radio processing and base band processing of signals of User Equipment (UEs) are performed, a Controller that controls a plural of Distributed Wireless Smart Antennas (DWSAs) through a DWSA Control Channel, and one or more antennas that generate one or more millimeter wave (mmWave) spatial beams to establish wireless links with one or more of the plural of DWSAs; and,
a plural of DWSAs spatially distributed over the coverage area of the CBS, wherein each DWSA comprises one or more first BS-facing antennas for the mmWave wireless link(s) between the one or more CBS and the DWSA (CBS-DWSA link), one or more UE-facing antennas that are capable of forming different radio wave beam patterns to establish mmWave wireless links between the DWSA and one or more UEs (DWSA-UE link), a Control Module, a Communication Module for the DWSA Control Channel that receives commands from the one or more CBSs and sends information about the DWSA to the one or more CBSs, and a Scanning Module that controls the UE-facing antenna(s) to scan for spatial beam direction(s) or beam alignment to build one or more DWSA-UE links
wherein the one or more CBS send control signal(s) to one or more of the plural of DWSAs over the DWSA Control Channel via the DWSAs' Communication Modules, the DWSAs' Control Modules use the control signal(s) to manage the scanning by their Scanning Modules, and the one or more CBS communicate with the one or more UEs through the CBS-DWSA link(s) and the DWSA-UE link(s).

2. The wireless system of claim 1 wherein a CBS uses one or more first spatial beams, each of which uses a first frequency band to establish a CBS-DWSA link with one or more DWSA(s), each of which uses one or more second spatial beams to establish the DWSA-UE link(s), wherein each of the second spatial beams uses a second frequency band, and the sum of the bandwidth of the second frequency bands of the one or more second spatial beams of all the one or more DWSA(s) is equal to or smaller than the sum of the bandwidth of the first frequency bands of the one or more first spatial beams.

3. The wireless system of claim 1 wherein the mmWave wireless link(s) use a frequency band that is located above 10 GHz in the radio spectrum.

4. A Distributed Wireless Smart Antenna (DWSA) comprising
one or more BS-facing antennas for establishing mmWave wireless link(s) between one or more Central Base Stations (CBS) and the DWSA (CBS-DWSA link), one or more User-Equipment-facing (UE-facing) antennas that are capable of forming different radio wave beam patterns to establish mmWave wireless links between the DWSA and one or more UEs (DWSA-UE link), one or more Downlink (DL) circuit paths and one or more Uplink (UL) circuit paths that connect the BS-facing antenna(s) with the UE-facing antenna(s), a Communication Module for a DWSA Control Channel, a Scanning Module that uses the UE-facing antenna(s) to scan for spatial beam direction(s) or beam alignment to build one or more DWSA-UE links, and a Control Module that receives commands from the one or more CBSs and sends information about the DWSA to the one or more CBSs through the Communication Module and manages the Scanning Module,
wherein a plural of DWSAs are spatially distributed over the coverage area of the one or more Central Base Stations (CBS), each of which comprises a connection to a network, a Controller that controls a plural of Distributed Wireless Smart Antennas (DWSAs) through the DWSA Control Channel, one or more antennas that generate one or more millimeter wave (mmWave) spatial beams to establish wireless links with one or more of the plural of DWSAs, and a Base Band Unit (BBU) and a Radio Unit (RU) that communicate with the one or more UEs through the CBS-DWSA link(s) and the DWSA-UE link(s).

5. The Distributed Wireless Smart Antenna of claim 4 wherein one or more antennas are used for both the UE-facing DWSA-UE link(s) and the BS-facing CBS-DWSA wireless link(s).

6. The Distributed Wireless Smart Antenna of claim 4 wherein a CBS-DWSA link and a DWSA-UE link share a common frequency band.

7. The Distributed Wireless Smart Antenna of claim 4 further comprising an interference cancelation circuit that samples the transmitted signal to generate a cancelation signal to be added to the received signal to reduce the self-interference when the same frequency band(s) are used for the CBS-DWSA link(s) and the DWSA-UE link(s).

8. The Distributed Wireless Smart Antenna of claim 4 wherein the Communication Module of the DWSA uses a lower frequency band for the DWSA Control Channel to communicate with a CBS wherein the lower frequency band provides better coverage and propagation property than the mmWave band used for the CBS-DWSA links and/or the DWSA-UE links.

9. The Distributed Wireless Smart Antenna of claim 8 wherein the lower frequency band is located below 6 GHz in the radio spectrum.

10. The Distributed Wireless Smart Antenna of claim 4 further comprising one or more carrier frequency shift circuits when different frequency bands are used for the CBS-DWSA link(s) and the DWSA-UE link(s).

11. The Distributed Wireless Smart Antenna of claim 4 further comprises a UE detection circuit that detects the presence of UE(s) in its coverage area, reports to CBS the detection of UE(s) and puts the DWSA into working mode or power save mode based on the presence or absence of UE(s) in the DWSA's coverage area.

12. The Distributed Wireless Smart Antenna of claim 4 wherein the Control Module commands the Communication Module to send signals to one or more CBSs including its Identification (ID) number and its achievable beam patterns of each UE-facing antenna, the beam pattern of a BS-facing antenna associated with the associated CBS, its current UE-facing antenna scanning beam patterns, and/or pilot signals for the CBS(s) to estimate the channels.

13. The Distributed Wireless Smart Antenna of claim 4 wherein the scanning for spatial beam direction(s) or beam alignment to build one or more DWSA-UE links is conducted repeatedly to track the movement of the one or more UEs or the directional change of the associated antennas.

14. The Distributed Wireless Smart Antenna of claim 4 further comprising a RF repeater which repeats a RF signal on a part of the spectral band to another DWSA that is not in the Line of Sight (LoS) of a CBS so that a part of the RF signal from the CBS can reach the said DWSA not in the LoS of the CBS.

15. The Distributed Wireless Smart Antenna of claim 4 further comprising a Customer Premise Equipment Module (CPE) or a Small Cell Module (SC) wherein the DWSA uses a part of the spectral band to serve the CPE or SC and a part of the spectral band to serve the DWSA-UE link(s) or wireless links with one or more other DWSAs.

16. A Central Base Station (CBS) comprising
a connection to a network, one or more antennas that generate a plural of millimeter wave (mmWave) spatial beams to establish wireless links with a plural of Distributed Wireless Smart Antennas (DWSAs) (CBS-DWSA links), a DWSA Controller that communicates over a DWSA Control Channel with and controls a plural of DWSAs including managing a Scanning Module at one or more of the plural of DWSAs to use their UE-facing antenna(s) to select beam patterns and/or to scan for spatial beam direction(s) or beam alignment to build one or more mmWave wireless links (DWSA-UE links) with one or more UEs, and a Base Band Unit (BBU) and a Radio Unit (RU) that communicate with the one or more UEs through the CBS-DWSA link(s) and the DWSA-UE link(s),
wherein the plural of DWSAs are spatially distributed over the coverage area of the CBS, and each DWSA comprises one or more first BS-facing antennas for the CBS-DWSA link(s), one or more UE-facing antennas that are capable of forming different radio wave beam patterns to establish the DWSA-UE link(s), a Control Module, a Communication Module for the DWSA Control Channel that receives commands from one or more CBSs and sends information about the DWSA to the one or more BSs, and a Scanning Module that controls the UE-facing antenna(s) to scan for spatial beam direction(s) or beam alignment to build one or more DWSA-UE links.

17. The Central Base Station of claim 16 wherein the DWSA Control Channel uses a frequency band located below 6 GHz in the radio spectrum or a lower frequency band which provides better coverage and propagation property than the mmWave band used for the CBS-DWSA links and/or the DWSA-UE links.

18. The Central Base Station of claim 16 wherein the CBS coordinates the beam directions of a plural of DWSAs to reduce interference among the DWSA-UE links of the plural of DWSAs.

19. The Central Base Station of claim 16 wherein the CBS beamforms to a plural of DWSAs using multi-user MIMO (MU-MIMO) to spatially multiplex the same frequency band to serve the plural of DWSAs.

20. The Central Base Station of claim 19 wherein the CBS further performs channel estimation of the total channels between the CBS and a plural of UEs with the plural of DWSAs included as part of the total channels between the CBS and the UEs (the CBS-DWSA-UEs channels), and performs MU-MIMO spatial multiplexing Pass-Through Beamforming (PTB) with the plural UEs through the total channels.

* * * * *